United States Patent
Davies et al.

(10) Patent No.: US 12,537,301 B2
(45) Date of Patent: Jan. 27, 2026

(54) SYSTEM ARCHITECTURE AND METHOD FOR DYNAMICALLY OPTIMIZED IMPEDANCE MATCHING FOR ANTENNA FEEDS

(71) Applicant: Rockwell Collins, Inc., Cedar Rapids, IA (US)

(72) Inventors: Orion D. Davies, Cedar Rapids, IA (US); Alexander B. Kozyrev, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 325 days.

(21) Appl. No.: 18/203,422

(22) Filed: May 30, 2023

(65) Prior Publication Data

US 2024/0405431 A1    Dec. 5, 2024

(51) Int. Cl.
*H04B 1/04* (2006.01)
*H01Q 5/335* (2015.01)
*H04L 25/02* (2006.01)

(52) U.S. Cl.
CPC ......... *H01Q 5/335* (2015.01); *H04L 25/0278* (2013.01); *H04L 25/029* (2013.01)

(58) Field of Classification Search
None
See application file for complete search history.

(56) References Cited

U.S. PATENT DOCUMENTS

| | | | |
|---|---|---|---|
| 8,134,414 B2 | 3/2012 | McCorquodale et al. | |
| 8,164,159 B1 | 4/2012 | Armstrong et al. | |
| 10,177,744 B2 * | 1/2019 | Tenbroek | H03J 7/04 |
| RE47,755 E * | 12/2019 | Hyde | G06K 19/0726 |
| 2016/0006476 A1 * | 1/2016 | El-Rayis | H04B 1/48 455/78 |
| 2017/0093040 A1 * | 3/2017 | Backes | H01Q 9/16 |
| 2022/0247436 A1 * | 8/2022 | Petkov | H04B 17/13 |

FOREIGN PATENT DOCUMENTS

| | | | | |
|---|---|---|---|---|
| CN | 105721013 A | * | 6/2016 | ........... H04B 17/102 |
| CN | 208836137 U | * | 5/2019 | |
| CN | 114389631 A | * | 4/2022 | ......... H04L 25/0278 |
| CN | 115047655 A | | 9/2022 | |
| EP | 3963355 A1 | | 3/2022 | |
| KR | 102424395 B1 | | 7/2022 | |
| WO | WO-2020131406 A1 | * | 6/2020 | ......... A61B 5/14532 |

OTHER PUBLICATIONS

European Patent Office, Extended European Search Report received in EP Application No. 24174459.8, Oct. 15, 2024, 9 pages.

* cited by examiner

*Primary Examiner* — Mohammed Rachedine

(74) *Attorney, Agent, or Firm* — Suiter Swantz IP

(57) ABSTRACT

A communication system applies impedance matching to an antenna specific to individual samples of a transmit signal. The system samples a signal and identifies the peak frequency content of each sample. Based on the peak frequency content, the system identifies an impedance match for a given antenna that provides the greatest energy transmission. The sampled portion of the signal is delayed to accommodate processing time to determine the impedance match and control settings. Control settings may be applied via discrete digital circuitry or continuous analog circuitry.

20 Claims, 3 Drawing Sheets

SYSTEM ARCHITECTURE AND METHOD FOR DYNAMICALLY OPTIMIZED IMPEDANCE MATCHING FOR ANTENNA FEEDS

BACKGROUND

Existing antennas are optimized for impedance matching at a particular carrier frequency, which dictates an antenna size for optimum transmission and reception to get the most energy into or out of that antenna. Those sizes are very large for lower frequency carriers, and often aerodynamically unfeasible, too large, or too heavy to place on mobile platforms (such as helicopters and unmanned aerial vehicles). However, because the channel being used is defined by the carrier frequency, electrically small antennas are utilized to reduce size, weight, aerodynamic drag, and in some cases the radar cross section. Electrically small antennas limit the potential bandwidth (i.e. how much data can be modulated onto the carrier) and limit the operational range of the antenna system.

Electrically short antennas suffer from very limited bandwidth resulting from reflection at the end of the antenna. Due to very short electrical length, the reflected signal returns to the feed at nearly the same phase and almost entirely cancels out the signal. This effects the power transfer from the generator to antenna and leads to extremely small radiation efficiency. This is especially important when the carrier wavelength is very long compared to the antenna size.

Reflections are typically mitigated by matching networks. There are several fundamental limitations associated with the matching networks based on standard lumped components, such as the Bode-Fano criterion defining the trade-off between the reflection coefficient, the maximum allowable reflection in the pass band, and the bandwidth. Based on this criterion, the matching of transmitting antennas to the source using traditional resonant networks is currently possible only in a very narrow bandwidth.

Furthermore, the system requires more power and electronics to amplify, filter, and recover a signal because the antenna cannot capture and radiate as much of the transmit signal energy into free space.

It would be advantageous to have a system that configures an antenna through dynamic impedance matching to accommodate specific frequency content of a given signal in real-time.

SUMMARY

In one aspect, embodiments of the inventive concepts disclosed herein are directed to a communication system that applies impedance matching to an antenna specific to individual samples of a Very Low Frequency (VLF) transmit signal. The system samples a signal for time intervals less than one period of the carrier frequency and identifies the peak frequency content of each sample. Based on the peak frequency content, the system identifies an impedance match for a given antenna that enables the optimal energy transmission.

In a further aspect, the sampled portion of the signal is delayed to accommodate processing time to determine the impedance match and control settings to change the match accordingly.

In a further aspect, control settings may be applied via discrete digital circuitry or continuous analog circuitry.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
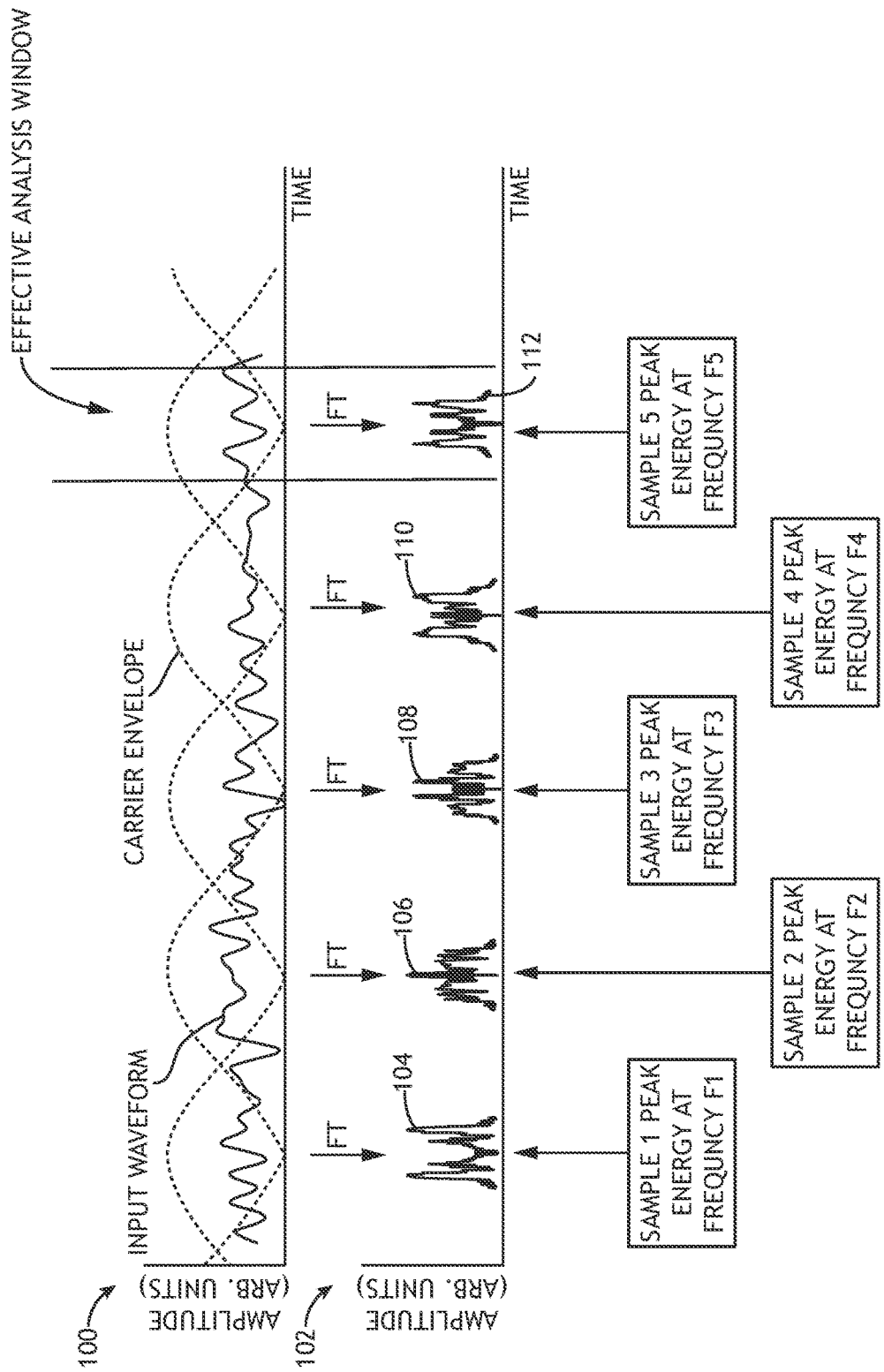
FIG. 1 shows a block diagram of a modulated waveform, an envelope representing the carrier signal, and an analysis window for digital sampling to process with Fast Fourier Transform to determining peak frequency content within the time interval, in a system according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a communication system that applies impedance matching to an antenna specific to individual samples of a transmit signal. The system samples a signal and identifies the peak frequency content of each sample. Based on the peak frequency content, the system identifies an impedance match for a given antenna that provides the greatest energy transmission. The sampled portion of the signal is delayed to accommodate processing time to determine the impedance match and control settings. Control settings may be applied via discrete digital circuitry or continuous analog circuitry.

Referring to FIG. 1, a block diagram of waveform modulation in a communication system according to an exemplary embodiment is shown. Communication systems are optimized for impedance matching to maximize efficiency of radiated power for a radiating element. By design the optimization is done at a single carrier frequency. Modulating the carrier wave 100 introduces all kinds of other frequency content 102. Any deviation from the specific, continuous wave, sinusoidal carrier frequency envelope of the design results in loss of radiated power.

For any waveform sample 104, 106, 108, 110, 112 at a time window less than a full cycle of the carrier wave 100, the peak energy of the waveform in the frequency domain will not be at the carrier frequency. This results in a decrease of radiated power during the sampled time interval due to impedance mismatch during transmission of that sampled portion.

Figure 2:
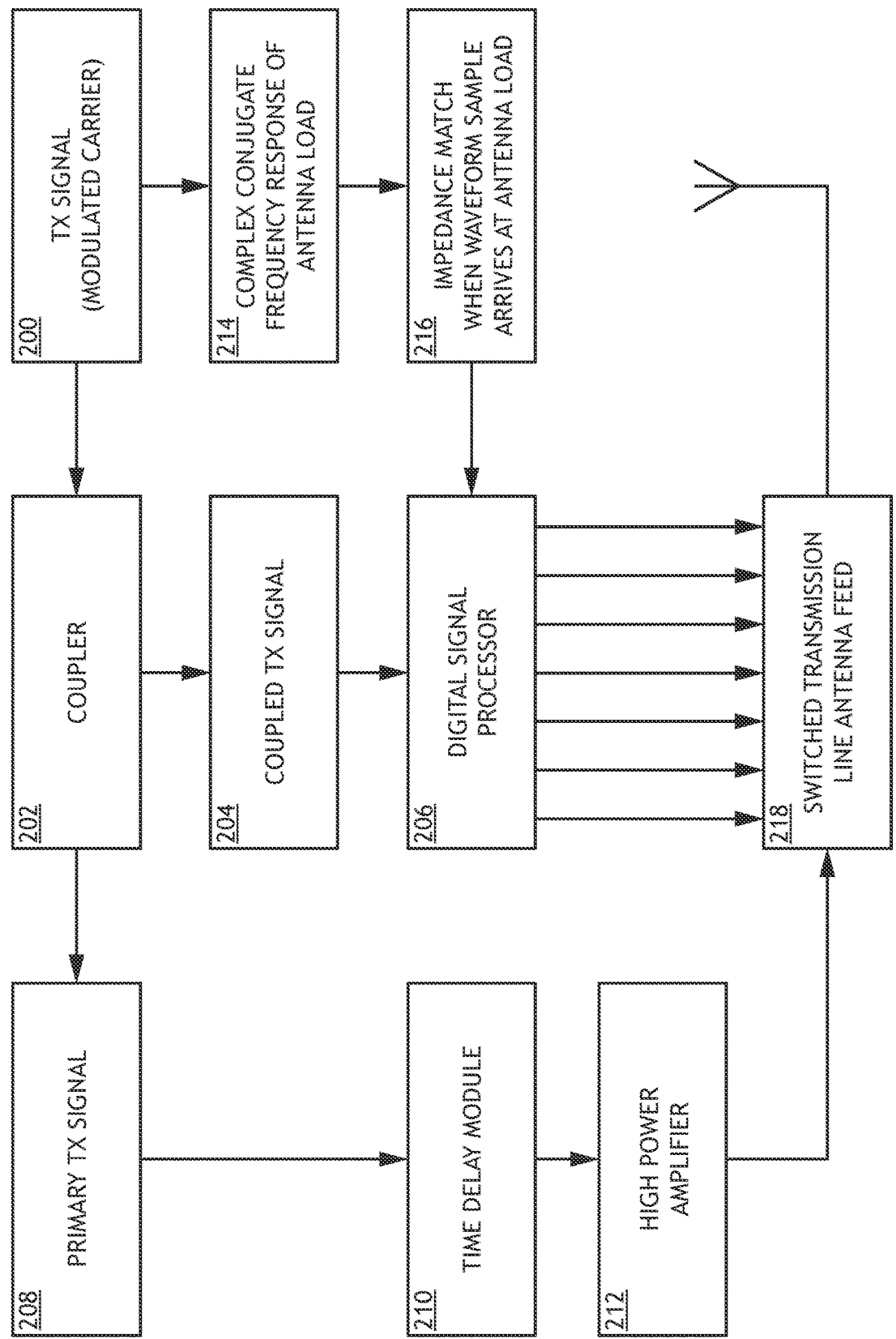
FIG. 2 shows a block diagram of a system for impedance matching according to an exemplary embodiment.

Referring to FIG. 2, a block diagram of a system for impedance matching according to an exemplary embodiment is shown. A communication system generates a transmission signal 200 by modulating a carrier wave. The transmission signal 200 is coupled via a coupler 202 and the coupled transmission signal 204 is transferred to a digital signal processor 206 that performs digitization, signal processing, and control output signals.

In at least one embodiment, the digital signal processor 206 regularly samples the coupled transmission signal 204. Such samples may be for some interval less than one full carrier wave cycle. For each sample, the digital signal processor 206 identifies peak frequency content in the sample. In at least one embodiment, the processes of identifying peak frequency content may include applying a Fourier transformation on each sample.

Once the digital signal processor 206 has identified the peak frequency content for each sample, the system identifies an impedance match corresponding to that peak frequency content. In at least one embodiment, an impedance match process 216 may identify the impedance match and control signal configuration with reference to a predefined model or lookup table 214 of complex conjugate frequency response of antenna load. For example, a predefined model based on the structure and design of the antenna 220 may associate peak frequency content to an impedance match via some function. Alternatively, the impedance match process 216 may map the peak frequency content to a lookup table of all possible inputs. Alternatively, the impedance match process 2167 may define a neural network or other machine learning algorithm trained on a dataset comprising antenna features, peak frequency content, and resulting radiating efficiency.

In at least one embodiment, the digital signal processor 206 applies the identified impedance match to an impedance modulated transmission line antenna feed 218. Such impedance match may be applied discretely via digital switches. In such embodiments, the digital signal processor 216 may be configured to identify appropriate discrete switch settings to implement the impedance match via a switch control bus. The appropriate discrete switch settings may be embodied in a logic map, predefined function, or the like. Alternatively, the digital signal processor 206 may associate the identified impedance match with continuous (non-discrete) transmission line antenna feed settings. Such continuous settings may be applied via an analog control bus. Switches suitable for manipulating the switched transmission line antenna feed may comprise a tunable varactor, a tunable inductor, or the like. It may be appreciated that appropriate switches may be defined by the operating range of the communication system. For High Frequency HF bands and below, the system may utilize nanosecond or tens of nanoseconds switches; for higher frequencies, switches that operate in picosecond ranges may be necessary. Such embodiments are envisioned. It may be appreciated that the digital signal processor 206 and the impedance match process 216 may embodied in a general-purpose processor configured via non-transitory processor executable code, or as a state machine or other specialty processor configured via hardware or firmware to execute the described functions.

In at least one embodiment, digital signal processing (identifying the peak frequency content, corresponding impedance match, and settings to implement such impedance match) requires some amount of time. The system may include a delay module 210 in parallel with the digital signal processor 206. The delay module 210 receives a primary transmission signal 208 from the coupler 202, and delays the primary transmission signal 208 for a period of time to accommodate the digital signal processing. In at least one embodiment, the period of time may be predetermined; alternatively, the delay module 210 may be in data communication with the digital signal processor 206, and may delay the primary transmission signal 208 until the digital signal processor 206 sends a signal indicating the processing is complete. The delay module 210 then releases the primary transmission signal 208 to the switched transmission line antenna feed 218 for transmission via the antenna 220. In at least one embodiment, the primary transmission signal 208 may be amplified via a high-power amplifier 212 before transmission. In at least one embodiment, the time delay may be implemented in the digital domain and synthesized by the processor 206.

In at least one embodiment, the switch control bus is always operating dynamically. The digital signal processor 206 and delay module 210 are synchronized such that when the sampled waveform arrives in time, the logic controls have been toggled accordingly with minimal loss for the peak frequency content of that sample. While the sampled waveform is radiating, the next sample is progressing and the control state has changed again.

Figure 3:
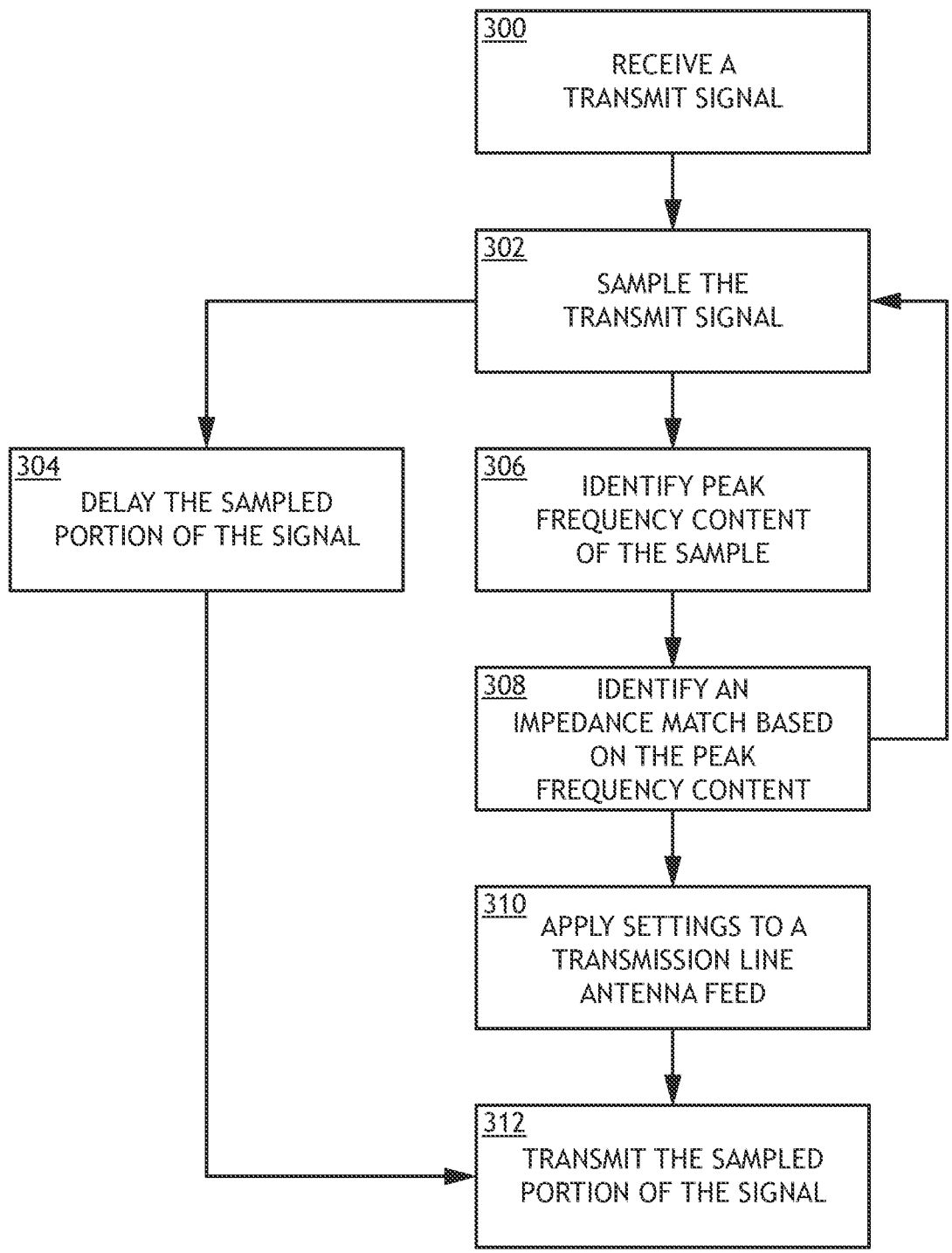
FIG. 3 shows a flowchart of a method according to an exemplary embodiment.

Referring to FIG. 3, a flowchart of a method according to an exemplary embodiment is shown. A digital signal processor receives 300 a transmission signal and samples 302 the transmission signal for each carrier wave cycle. Each sample is delayed 304 while the sample is processed.

The digital signal processor identifies 306 peak frequency content for each sample via a process such as Fourier transformation, and associates 308 the peak frequency content with an impedance match. Such impedance match may be based on the structure and design of a system antenna. In at least one embodiment, the impedance match may be associated 308 with the peak frequency content via a lookup table, function based on a mathematical model, a trained artificial intelligence, or the like.

The digital signal processor determines control settings for a switched transmission line antenna feed, either via discrete switches or continuous analog circuitry. The settings are then applied 310 to the switched transmission line antenna feed. The sample is then transmitted 312.

While the system is applying settings to the transmission line antenna feed, the digital signal processor is identifying 306 peak frequency content for subsequent samples.

Embodiments of the present disclosure enable a higher data rate in electrically small antennas. Alternatively, when operated at a similar data rate as compared to conventional systems, the antenna may be reduced in size and/or the system may exhibit improved radiating efficiency. A system according to at least one embodiment samples each cycle, determines a peak frequency content, and alters the impedance match to the antenna to be optimum for the peak frequency content of that sample.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An antenna comprising:
at least one processor in data communication with a memory storing processor executable code for configuring the at least one processor to:
receive a transmission signal;
periodically sample the transmission signal in a transmit path prior to radiation, the sampling being performed for each carrier wave cycle, and over a time window shorter than one period of the carrier wave;
identify peak frequency content in each sample;
determine an impedance match based on the identified peak frequency content; and
apply the impedance match to an antenna.

2. The antenna of claim 1, wherein the at least one processor is further configured to delay the sampled portion of the transmission signal.

3. The antenna of claim 1, wherein determining the impedance match comprises referencing a lookup table.

4. The antenna of claim 1, wherein determining the impedance match comprises applying a predefined model.

5. The antenna of claim 1, wherein applying the impedance match comprises applying discrete control logic settings to a transmission line antenna feed.

6. The antenna of claim 1, wherein applying the impedance match comprises applying a continuous control signal to a transmission line antenna feed.

7. A method comprising:
receiving a transmission signal;
periodically sampling the transmission signal in a transmit path prior to radiation, the sampling being performed for each carrier wave cycle, and over a time window shorter than one period of the carrier wave;
identifying peak frequency content in each sample;
determining an impedance match based on the identified peak frequency content;
applying the impedance match to an antenna for each sample; and
synchronizing control updates to the arrival of each sample at the antenna.

8. The method of claim 7, further comprising delaying the sampled portion of the transmission signal.

9. The method of claim 8, further comprising:
receiving a signal that the impedance match has been applied; and
releasing the sampled portion for transmission.

10. The method of claim 7, wherein determining the impedance match comprises referencing a lookup table.

11. The method of claim 7, wherein determining the impedance match comprises applying a predefined model.

12. The method of claim 7, wherein applying the impedance match comprises applying discrete control logic settings to a transmission line antenna feed.

13. The method of claim 7, wherein applying the impedance match comprises applying a continuous control signal to a transmission line antenna feed.

14. A communication system comprising:
an antenna;
a coupler configured to provide a coupled transmission signal to at least one processor while passing a primary transmission signal along a transmit path; and
at least one processor in data communication with the antenna, the coupler, and a memory storing processor executable code for configuring the at least one processor to:
receive a coupled transmission signal;
periodically sample the coupled transmission signal in a transmit path prior to radiation, the sampling being performed for each carrier wave cycle, and over a time window shorter than one period of the carrier wave;
identify peak frequency content in each sample;
determine an impedance match based on the identified peak frequency content;
apply the impedance match to the antenna; and
synchronize control updates so that the impedance match is applied during transmission of the corresponding sample.

15. The system of claim 14, wherein the at least one processor is further configured to delay the sampled portion of the coupled transmission signal.

16. The system of claim 15, wherein the sampled portion is delayed for a predetermined period of time.

17. The system of claim 14, wherein determining the impedance match comprises referencing a lookup table.

18. The system of claim 14, wherein determining the impedance match comprises applying a predefined model.

19. The system of claim 14, wherein applying the impedance match comprises applying discrete control logic settings to a transmission line antenna feed.

20. The system of claim 14, wherein applying the impedance match comprises applying a continuous control signal to a transmission line antenna feed.

* * * * *